United States Patent [19]

Kemper

[11] 4,393,964
[45] Jul. 19, 1983

[54] HYBRID POWER SYSTEM AND METHOD FOR OPERATING SAME

[75] Inventor: Yves J. Kemper, Birmingham, Mich.

[73] Assignee: Ipanema Company, Bloomfield Hills, Mich.

[21] Appl. No.: 229,056

[22] Filed: Jan. 28, 1981

Related U.S. Application Data

[63] Continuation of Ser. No. 23,398, Mar. 23, 1979, abandoned, which is a continuation-in-part of Ser. No. 938,904, Sep. 1, 1978, abandoned.

[51] Int. Cl.³ .............................................. B60K 41/28
[52] U.S. Cl. .................................. 192/.044; 192/.076; 192/.09; 192/3.58; 74/191
[58] Field of Search .................... 192/.098, .077, .076, 192/.075, 103 R, .094, .09, 3.58, 3.57, .082, .096, 3.52, .044; 74/190, 190.5, 191, 572, 690, 866, 851; 180/165; 123/332, 333

[56] References Cited

U.S. PATENT DOCUMENTS

| | | | |
|---|---|---|---|
| 2,957,463 | 10/1960 | Schnabel | 123/332 |
| 3,665,788 | 5/1972 | Nyman | 180/165 X |
| 3,734,222 | 5/1973 | Bardwick . | |
| 3,771,311 | 11/1973 | Herbst | 74/751 X |
| 3,848,410 | 11/1974 | Kinoshita . | |
| 3,867,814 | 2/1975 | Schneider | 74/572 X |
| 3,882,950 | 5/1975 | Strohlein . | |
| 3,886,810 | 6/1975 | Sugiyama et al. | 74/572 X |
| 3,910,043 | 10/1925 | Clerk . | |
| 4,116,006 | 9/1978 | Wallis | 74/572 X |
| 4,126,200 | 11/1978 | Miller et al. . | |
| 4,131,171 | 12/1978 | Keyes | 74/572 X |
| 4,187,741 | 2/1980 | Nyman | 74/751 |
| 4,233,851 | 11/1980 | Kemper | 74/690 X |
| 4,252,208 | 2/1981 | Heidemeyer . | |
| 4,282,947 | 8/1981 | Kemper | 74/572 |

FOREIGN PATENT DOCUMENTS

| | | |
|---|---|---|
| 1328436 | 8/1973 | United Kingdom . |
| 1494128 | 12/1977 | United Kingdom . |
| 1512949 | 6/1978 | United Kingdom . |

*Primary Examiner*—George H. Krizmanich
*Attorney, Agent, or Firm*—Ziems & Walter

[57] ABSTRACT

A hybrid power system and method in which a piston engine prime mover having a direct crank shaft power output is combined with a kinetic energy storing flywheel and a variable speed transmission in a manner such that the flywheel serves both as a crank shaft flywheel and as a supply of kinetic energy used to augment the power developed by the prime mover, as a substitute for prime mover developed power or as an auxiliary source of power for continued operation of prime mover driven accessories while the prime mover is shut off. The system enables the storage of kinetic energy resulting from the momentum of an inertial load such as an automotive vehicle and in doing so, conserves the kinetic energy of vehicular deceleration and enables engine shut-down during intermittent operation such as operation of an automotive vehicle under city driving conditions. The variable speed transmission is preferably an infinitely variable or I.V. transmission which augments the energy storing capacity of the flywheel and further enables a direct drive relationship between the prime mover and the load.

34 Claims, 6 Drawing Figures

HYBRID POWER SYSTEM AND METHOD FOR OPERATING SAME

CROSS-REFERENCE TO RELATED APPLICATION

This is a continuation of application Ser. No. 06/023,398, filed Mar. 23, 1979 (now abandoned, which is a continuation in part of application Ser. No.) 938,904, filed Sept. 1, 1978, now abandoned.

BACKGROUND OF THE INVENTION

This invention relates to hybrid power systems and methods. More particularly, it concerns a hybrid power system and method by which kinetic energy of an inertial load during deceleration is stored and used in a manner to reduce the duration of engine operation for a given period of system operation.

As a result of current emphasis on fuel conservation, it is a well publicized fact that the fuel consumption of an automobile under city driving conditions is considerably higher than under highway driving conditions. The reasons for this are well known and primarily the result of energy losses in decelerating and stopping a vehicle in city traffic, idling operation of the engine while the vehicle is stopped and operation for large percentages of the distance travelled at engine speeds which are above speeds at which engine efficiency is optimum.

Hybrid power systems are known by which the fuel consumption of an automotive engine, particularly under city driving conditions, can be reduced substantially by storing in a flywheel, for example, the kinetic energy of vehicular momentum or negative power made available during deceleration and using the stored energy as an ancillary source of power, as needed, to reduce power demands on the engine or prime mover. Such systems also enable excess power developed by the engine, when operated at improved efficiencies, to be diverted to the flywheel for subsequent use. Moreover, the fuel consuming engine of the system may be shut off when the vehicle is stopped and the flywheel stored energy used both to accelerate the vehicle initially from a stop and to restart the engine.

Substantial reductions in fuel consumption and emission of air pollutants under city driving conditions can be realized with a hybrid system using a relatively simple flywheel represented, for example, by a carbon steel disc a few centimeters in thickness and between 40 and 50 centimeters in diameter rotated at top speeds on the order of maximum engine speeds. A flywheel of this class provides a kinetic energy storage capacity adequate not only to propel a conventional automotive vehicle for limited periods of time but perhaps more importantly, to supply power needed for continued operation of such accessories as power brakes, power steering, air conditioning and the like while the fuel consuming prime mover of the hybrid system is shut off.

In hybrid power systems, some form of infinitely variable or I.V. transmission is usually employed to relate the rotational speeds of the flywheel, the prime mover and the load represented by an automotive drive shaft, for example. While the I.V. transmission has in the past represented a weak link in hybrid power systems, such transmissions have been developed to a state where power in excess of that developed in automotive engines can be transmitted at high efficiencies through infinitely variable output/input speed ratios in a wide range extending to zero. Such transmissions are exemplified by the disclosure of a commonly owned, U.S. Pat. No. 4,152,946, issued May 8, 1979, to Yves Jean Kemper. The state-of-the-art relating to infinitely variable or I.V. transmissions, therefore, provides an existing capability for completely viable hybrid power systems by which the well known energy conserving features of such systems may be realized.

To accommodate highway driving conditions, the power train of an automotive vehicle should be adaptable to a direct driving connection of the prime mover or engine and the load or drive wheel. In prior hybrid systems, highway driving conditions have been met by de-clutching the energy storing flywheel from the drive train (see, for example, Scott, David. "Flywheel Transmission Has Variable-Speed Gear" Automotive Engineering, Mar. 1977, 85:3, pages 18–19 and U.S. Pat. No. 3,672,244-A. L. Nasvytas) or by shunting entirely the flywheel and I.V. transmission components of the hybrid system for transmission of power directly to load (e.g. U.S. Pat. No. 3,870,116-J. Seliber).

While the energy saving potential and operating requirements of hybrid power systems have been recognized in the prior art, therefore, the power train requirements of hybrid systems heretofore proposed have been complex in terms of required controls and component organization, space consuming by comparison to conventional automotive power trains and potentially an additional source of mechanical failure over and above that which already exists in a conventional power train. It is believed that the combination of these several factors, among others, have been a primary deterrent to the use of hybrid power systems in practice.

SUMMARY OF THE INVENTION

In accordance with the present invention, a hybrid power system and method is provided in which the major causes of wasted fuel consumption during operation represented by an automotive vehicle under city driving conditions, namely, continued engine idle during vehicle or load deceleration and rest, and dissipation of kinetic energy during vehicle braking, are substantially avoided by a power train using a flywheel which is the approximate equivalent of a conventional crank shaft flywheel and an infinitely variable or I.V. transmission permitting optimum engine power generating speeds for low and moderate vehicle speeds while at the same time permitting a direct engine-drive wheel connection during a mode of operation represented by an automotive vehicle operating under highway driving conditions. The flywheel is keyed or otherwise linked for rotation at all times with the input of the I.V. transmission and releasably coupled by a clutch, for example, directly to the crank shaft or equivalent power shaft of the prime mover. In other words, the position of the clutch is merely a reversal of the flywheel-clutch connection to the crank shaft of a conventional automotive drive train. Because the flywheel functions both as a crank shaft flywheel and as a kinetic energy storage flywheel, the flywheel is coupled with the engine at all times during power generating operation of the engine. It is either fully disengaged or partially engaged with the engine power shaft during load deceleration or rest while the engine is either shut off or cranked at low speeds while the fuel supply thereto is either reduced to below that necessary to maintain fueled engine idling operation or shut off completely. Such low speed cranking of the engine with little or no fuel consumption serves to maintain continuity of engine driven accessories such as the lubricating pump, electric generator and other such power accessories as power brakes, power steering, air conditioning and the like. Alternatively, such accessories may be arranged to be driven directly by the flywheel in which case complete shut-off of the engine is preferred.

The output of the I.V. transmission is coupled with the load propelling shaft through a simple gear box adjustable to provide "forward," "reverse" and "neutral" operating modes as well as to provide a direct connection of the propelling shaft with the input of the I.V. transmission. When the load propelling shaft is coupled with the input of the I.V. transmission, power transmitting efficiency losses in the I.V. transmission are avoided.

A principal object of the present invention is therefore, the provision of an improved hybrid power system and method having particular, but not exclusive, application to vehicular power trains, which requires minimal modification to existing vehicle structure for its use and which permits highly efficient operation of an I.V. transmission capable of relating the speed of both a prime mover power shaft and a flywheel with a load propelling shaft for rotation of the propelling shaft in forward and reverse directions while at the same time facilitating a direct power connection of the prime mover and the load.

Other objects and further scope of applicability of the present invention will become apparent from the detailed description to follow taken in conjunction with the accompanying drawings.

DETAILED DESCRIPTION OF THE PREFERRED EMBODIMENT

Figure 1:
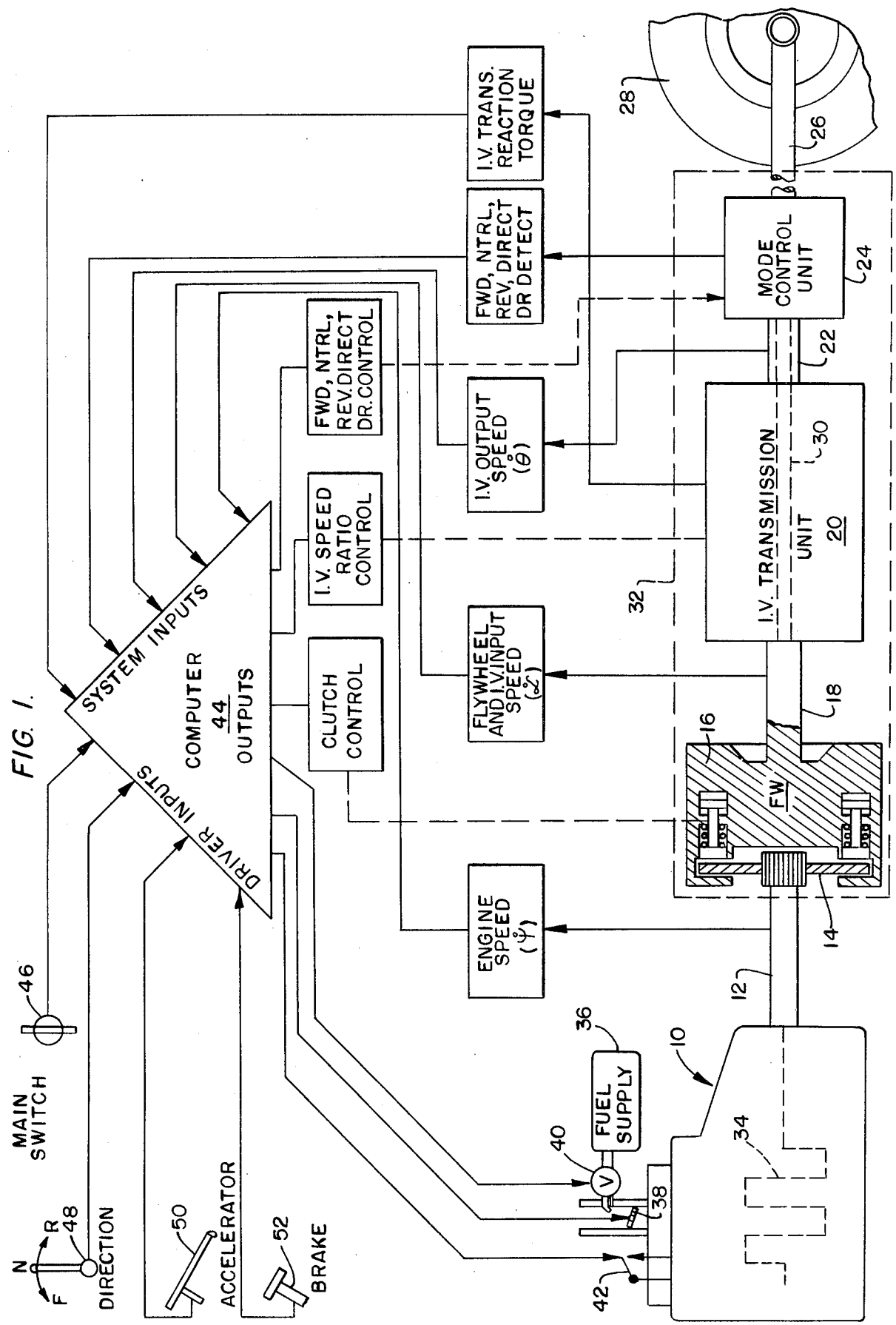
FIG. 1 is a schematic view illustrating various mechanical components of the hybrid power system of the present invention in relation to sensing and control functions represented in block diagram form.

In FIG. 1 of the drawings, the functioning components of a hybrid power system embodiment of the present invention are shown schematically to facilitate an understanding of interrelated working and control components as well as overall system operation. Thus, in FIG. 1, a prime mover is designated generally by the reference numeral 10 and shown to include a power shaft 12 releasably connected by a friction clutch 14 to a flywheel 16 rotatable with and, in this instance, carried by the input shaft 18 of a variable speed transmission unit 20 preferably of a type known in the art as an infinitely variable or I.V. transmission unit. The variable speed output of the transmission unit 20, represented by a shaft 22, is connected through a mode control unit 24 to a load propelling shaft 26 coupled by conventional differential gearing (not shown) to the drive wheels 28 of a vehicle to be propelled by the system. As will be described in more detail below, the transmission unit 20 additionally includes a direct drive shaft 30 represented by phantom lines in FIG. 1 extending from the input shaft 18 to the mode control unit 24. Also to be understood more clearly from the description to follow, the clutch 14, flywheel 16, transmission unit 20 and mode control unit 24 are components of a power train assembly 32 represented in FIG. 1 by the dashed line rectangle circumscribing these components.

It is to be noted that although the hybrid power system embodiment both represented by the schematic illustration in FIG. 1 and to be described in more detail hereinafter is depicted as a vehicular power system in which system load is represented by the drive wheels 28 of a powered vehicle, the system is equally applicable to other inertial loads or loads which require power for acceleration and which exhibit inertial momentum during deceleration. Similarly, while the prime mover 10 is represented in FIG. 1 as a carbureted spark ignition piston engine, other forms of prime movers may be used and may be preferred from the standpoint of achieving optimized system operation. The system of the invention has particular utility with fuel injected spark ignition engines, diesel engines, Stirling engines and other prime movers which operate to convert a succession of discrete power impulses to continuous rotary output or power shaft motion. It will be noted in this respect, therefore, that the engine 10 includes a crank shaft 34 and that the power shaft 12 is a direct extension of the crank shaft. More importantly, the organization of the crank shaft 34 and the power shaft 12 is devoid of the conventional crank shaft flywheel or other added inertial components by which continuity and smoothness of rotation in the power shaft 12 will be maintained absent an auxiliary supply of kinetic energy.

Irrespective of the particular type of engine used as the prime mover 10, it will have a supply of potential energy represented by a fuel supply 36 from which fuel may be fed or directed to the prime mover under the control of the throttle 38, for example, in normal operation at speeds varying from idling speeds with the throttle substantially closed to maximum speeds with the throttle wide-open. In accordance with the present invention, the supply of potential energy or fuel is additionally regulated for complete shut-off or for reduction to supply levels less than that needed for prime mover operation using only potential energy or fuel. In the embodiment represented schematically in FIG. 1, a valve 40 is provided in the line between a fuel supply and the prime mover upstream from the control represented by the throttle 38 so that the supply of fuel to the prime mover 10 may be cut off by closing the valve 40 or reduced to a level less than the lowest throttle setting. It is to be noted that in some engines, such as an internal combustion engine equipped with an electronic fuel injection system, for example, the function of the valve 40 may be served by the same device used to regulate the supply of fuel to the engine for controlling the power developed by the engine. In fact, fuel injection systems are preferred due to increased precision of fuel feed and the closer proximity of fuel flow regulation to combustion or working chambers by comparison to carbureted fuel feeds. Hence, the throttle 38 and valve 40 is merely representative of a particular means for reducing or shutting off the fuel supply 36 at the speed controlling throttle. Additionally, an ignition switch 42 will be provided in the case of a spark ignition engine or the equivalent of such an ignition switch provided for the purpose of enabling or disabling operation of the engine.

The working components thus described generally with reference to FIG. 1 are operated by a control system illustrated in block diagram form to include an electronic computer 44 for processing driver and system inputs to develop appropriate control signal outputs. Specifically, driver inputs include a power switch 46, a direction control 48, an accelerator 50 and a brake pedal 52. System functions which are monitored include engine speed $\dot{\psi}$, flywheel and transmission input speed $\dot{\alpha}$, variable transmission output speed $\dot{\theta}$, the operating mode of the unit 24 and the reaction torque of the transmission 20. Adjustable parameters to be controlled by the computer 44 include the ignition switch 42, the engine throttle 38 or other control of engine speed, the clutch 14, the speed ratio of the I.V. transmission 20, and the mode control unit 24. Although the details of the control system are not shown beyond the block diagram representation of FIG. 1, such computerized systems are well known and within the skill of one familiar with computer logic circuitry, given the desired operational characteristics to be accomplished.

Figure 2A:
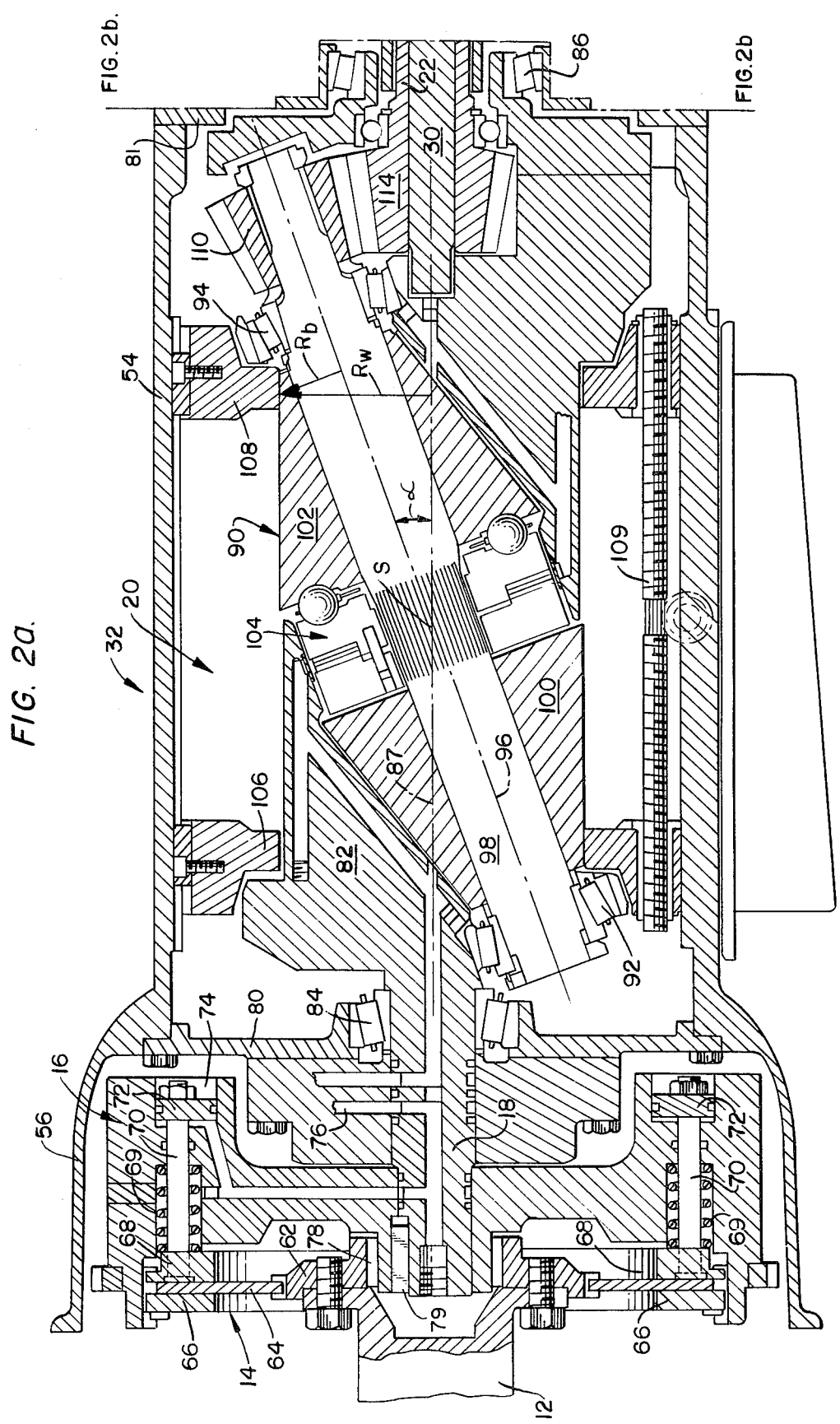
FIGS. 2a and 2b are segmented longitudinal cross-sections through a preferred embodiment of power train assembly to be incorporated in the invention.
Figure 2B:
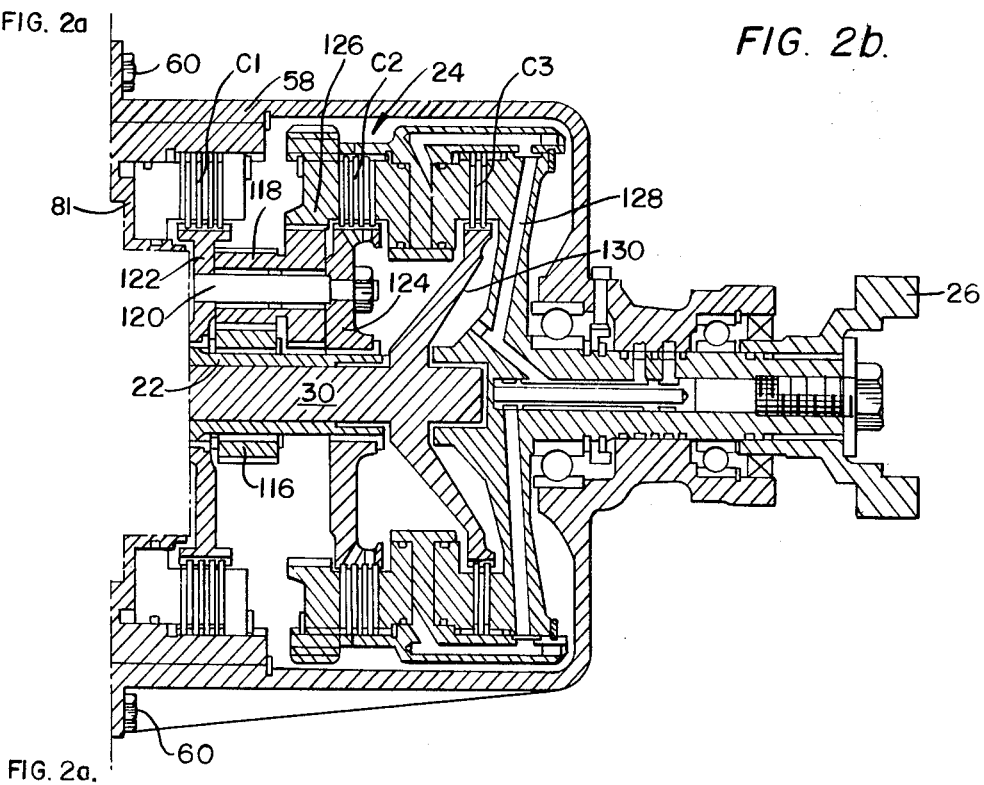

The structure of the power train assembly 32 is illustrated most clearly in FIGS. 2a and 2b of the drawings. The components of the assembly are housed within a single frame or casing 54 having a flared front portion 56 adapted to be bolted or otherwise fixed to the engine 10 in essentially the same manner as a conventional automotive transmission. This portion of the casing 54 contains the flywheel 16 and the clutch 14. The central portion of the casing houses and serves as a frame component of the I.V. transmission unit 20 whereas an end bell casing component 58 houses the mode control unit 24 and is secured to the central portion of the casing 54 such as by bolts 60.

As shown in FIG. 2a, the end of the power shaft 12 is conventionally flanged to mount a clutch disc hub 62 in turn splined to receive an axially movable, lightweight clutch disc 64. The disc 64 extends outwardly to be positioned between an axially fixed abutment ring 66 and an axially adjustable pressure pad ring 68, both carried directly by the flywheel 16. The adjustable pad 68 is urged by a series of compression springs 69 into engagement with the disc 64 and abutment 66, thereby to couple the disc 64 and thus the shaft 12 with the flywheel 16. The adjustable pad 68 is supported by rods 70 extending to an annular piston 72 movable in an annular chamber 74 again provided in the flywheel 16. Fluid under pressure at a passage way 76 will operate to retract the pad 68 against the bias of the compression springs 69.

In light of the foregoing, it will be appreciated that the clutch 14 is in the nature of a conventional friction clutch which may be adapted to fully couple the shaft 12 with the flywheel 16 in the absence of fluid pressure acting to move the annular piston against the bias of the springs 69. The shaft 12 will be completely decoupled from the flywheel 16 when fluid pressure acting against the annular piston 72 retracts the pad 68 away from the disc 64. Further, appropriate adjustment of fluid pressure acting against the annular piston 72 may effect a range of intermediate coupling conditions in the clutch 14 under which a limited torque may be transmitted between the shaft 12 and the flywheel 16 irrespective of the relative speeds of these members. Also as may be seen in FIG. 2a, the flywheel is separated in rotation from the shaft 12 and the hub 62 by roller bearings 78 and is splined, keyed or otherwise coupled for rotation directly with the input shaft 18 of the I.V. transmission unit 20 such as by a key 79.

As will be appreciated from the ensuing description, the precise form of the transmission unit 20 as well as the mode control unit 24 may vary considerably from that illustrated in FIGS. 2a and 2b of the drawings. The transmission unit 20 however, is preferably of a type disclosed in a commonly owned co-pending U.S. application Ser. No. 706,291, filed July 19, 1976, by the present inventor, Yves Jean Kemper (now U.S. Pat. No. 4,152,946). As such, the transmission structure includes as a frame, the central portion of the casing 54 and a pair of transverse wall members 80 and 81 in which a rotatable cranking body 82 is supported by bearings 84 and 86 for rotation about a primary or first axis 87. A nutatable body 90 is rotatably supported from the cranking body 82 by bearings 92 and 94 on a second axis 96 inclined with respect to the first axis 87 by the angle $\alpha$. The body 90 includes a supporting shaft 98 on which a pair of conical members 100 and 102 are supported for relative axial movement along the second axis 96 and for limited rotation relative to the shaft 98. The conical members 100 and 102 are spaced on the shaft 98 by a system of ball ramps, generally designated by the reference numeral 104 and which function to move the conical members 100 and 102 axially away from each other in response to torque loading on the transmission. The ball ramp system 104 is disclosed in a commonly assigned co-pending U.S. application Ser. No. 5,605, filed Jan. 22, 1979, by Harvey N. Pouliot, abandoned in favor of a continuation-in-part application Ser. No. 926,823, filed July 21, 1978.

Although the conical members 100 and 102 are permitted relative rotation on the supporting shaft 98, they are restrained against rotation with respect to the shaft 98 for a given torque loading on the transmission as a result of the ball ramp system 104 which is fixed or coupled for rotation with the shaft 98.

The exterior surfaces of the conical members 100 and 102 are of a variable radius $R_b$ and are in rolling friction engagement with interior traction surfaces of a radius $R_w$ on a pair of rings 106 and 108 fixed against rotation with respect to the casing 54 but axially movable along the first axis 87 toward and away from a point S of intersection of the axes 87 and 96 under the control of an electrically driven control screw 109.

Figure 3:
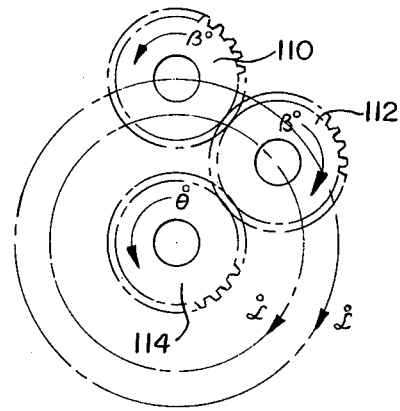
FIG. 3 is a schematic cross-section illustrating the coaction of gearing embodied in the transmission unit shown in FIG. 2.

As the cranking body 82 is driven by torque at the input shaft 18 of the transmission 20, the body 90 will be carried in nutation about the axis 87 causing rotation of the body 90 and thus of the shaft 98. The combined movement of the shaft 98 is transmitted by a bevel gear 110 coupled for rotation with the shaft 98, through an idler gear 112 (FIG. 3) carried by the cranking body 82, to a bevel gear 114 keyed for rotation with the variable output shaft 22 of the transmission on the axis 82. The relative movement of the gears 110, 112, and 114 is depicted in FIG. 3 of the drawings. Also the respective rotational speeds of these gears are related by the general equation:

$$\dot{\omega} + (\dot{\alpha} - \dot{\beta})p = 0$$

In this equation, $\overset{\circ}{\alpha}$ is the speed of rotation of the transmission input or of the cranking member 82; $\overset{\circ}{\beta}$ is the speed of rotation of the nutating body 90 about the axis 96 in a fixed frame of reference; $\overset{\circ}{\omega}$ is the rotational speed of the rings 106 and 108 about the axis 87; and $\rho$ is the ratio of the radii of the external concical surfaces on the membes 100 and 102 or $R_b$ to the radii on the traction surfaces of the rings 106 and 108 or $R_w$ ($\rho = R_b/R_w$). In the particular transmission shown, the rings 106 and 108 are held against rotation with the casing 54 so that $\overset{\circ}{\omega}=0$. The general equation may be simplified to $\overset{\circ}{\beta}=\overset{\circ}{\alpha}(1-1/\rho)$. Further, if the ratio of the number of teeth on the gear 110 divided by the number of teeth on the gear 114 is k, then the speed of the output shaft 22 ($\overset{\circ}{\theta}$) is related to k, $\rho$, and $\overset{\circ}{\alpha}$ by the equation:

$$\overset{\circ}{\theta} = \overset{\circ}{\alpha}(1-(k/\rho)).$$

From this latter equation, it will be apparent that the output rotation ($\overset{\circ}{\theta}$) will be a reversal of input rotation ($\overset{\circ}{\alpha}$) when the function k/$\rho$ is greater than 1; that output rotation will be zero regardless of input rotation when k/$\rho$ is equal to 1; and that output rotation will be in the same direction as input rotation when k/$\rho$ is less than 1. As will be observed from the geometrical configuration of the transmission 20 in FIG. 2a, the maximum numerical value of the function $\rho$ or $R_b/R_w$ will approach but not reach unity. The minimum value of $\rho$, though theoretically unlimited, is dependent on the physical dimensions of the transmission and in practice may extend to an approximate numerical value of 0.4, for example. The numerical value of k may be selected from a relatively wide range of numerical values and if equated to the maximum value of $\rho$, say 0.88, then the range of input/output speed ratios available in the transmission 20 will be infinite. Furthermore, a directional reversal of rotation at the output shaft 22 relative to the input shaft 18 may be achieved with adjustable values of $\rho$ which bracket or which extend above and below the numerical value of k. It is preferred that the transmission be designed with vlues of k and $\rho$ which permit at least a zero output shaft rotation ($\overset{\circ}{\theta}=0$) regardless of input shaft rotation ($\overset{\circ}{\alpha}$).

Although as indicated, the specific construction of the transmission 20 may differ from that illustrated in FIG. 2a without departure from the broader aspects of the invention, the illustrated construction provides several advantages which contribute to overall system integrity and operation. For example, the particular transmission embodiment illustrated provides a wide range of infinitely variable speed ratios and is capable of transmitting power in excess of that developed by conventional automotive engines at high efficiencies. The bearings 84 and 86 on which the cranking body 82 is rotatably supported also support the flywheel 16 and provide a substantial moment arm by which precessional forces exhibited by the flywheel 16 may be controlled. Furthermore, the cranking body 82 rotates directly with the flywheel 16 and thus represents, in itself, a kinetic energy storage capacity which augments that of the flywheel 16. As mentioned, design flexibility in the relative sizes of the gears 110, 112 and 114 or their equivalent, enables variation in system design including a possible elimination of the mode control unit 24. This is possible because of the facility for the transmission 20 to be designed to handle "forward," "neutral" and "reverse" modes of operation.

While the mode control unit may be considered as an optional component depending on the particular design of the transmission unit 20, its inclusion in the hybrid system of the invention is advantageous and as such is preferred. In particular, the mode control unit 24 permits a design of the transmission unit 20 which provides a wide range of infinitely or continuously variable input/output speed ratios; it enables a complete decoupling of the flywheel 16 as well as the engine 10 from the load propelling shaft 26; and it enables a direct coupling of the engine power shaft 12 with the load propelling shaft 26. The structural organization by which these characteristics are obtained may be appreciated by reference to FIG. 2b of the drawings.

In FIG. 2b, it will be noted that the variable speed output shaft 22 of the transmission unit 20 is a tubular shaft to which a sun gear 116 is keyed or otherwise coupled for direct rotation with the shaft 22. The sun gear 116 meshes with one or more, preferably three planet gears 118 rotatable on shafts 120 carried by a pair of interconnected carrier rings 122 and 124 journalled for rotation on the variable speed output shaft 22. In the embodiment disclosed, the planets 118 are compound planet gears which extend in meshing relation between the sun gear 116 and a ring gear 126. The ring gear 126 is fixed for direct rotation with a spider assembly 128 which in turn is coupled for rotation directly with the propelling shaft 26.

As will be seen from the speed ratio equations given above, the widest range of variable speed ratios in the transmission unit 20 is provided where the rotational direction of the variable speed output shaft 22 is opposite to that of the input shaft 18. To facilitate a direct drive connection of the input shaft 18 to the propelling shaft 26 it is preferred that in a "forward" mode of operation, power transmission between the variable speed output shaft 22 and the propelling shaft 26 effect a directional reversal of these two shafts. To provide this mode of operation, therefore, a clutch C1 is provided by which the carrier rings 122 and 124 are locked against rotation. Thus, power will be transmitted from the sun gear 116 and output shaft 22 through the planet gears 118 to the ring gear 126 and spider 128 to the propelling shaft 26. To provide a "reverse" operational mode, the clutch C1 is disengaged and a clutch C2 engaged to lock the assembly of the sun gear carrier rings 122, 124, planet gear 118 and sun gear 116 as a unit. In this mode of operation, the propelling shaft 26 will be driven directly with the variable speed output shaft 22. A third clutch C3 is provided to effect a "direct drive" mode. In this respect it will be noted that the shaft 30, which extends through the hollow variable speed output shaft 22, is keyed or otherwise connected for direct rotation with the cranking body 82 of the transmission unit 20 (see FIG. 2a) and extends between the body 82 and a flared plate 130. The plate 130 is releasably engageable by the clutch C3 to the spider assembly 128 such that when the clutch C3 is engaged, a direct torque transmitting train exists between the transmission unit input shaft 18 and the propelling shaft 26.

A "neutral" condition of the mode control unit 24 is provided by merely adjusting the three clutches C1, C2 and C3 to a disengaged condition. It will be noted also that the clutches C1, C2 and C3 are alternately engageable in the sense that only one of the three clutches is engaged while the other two are disengaged to provide the various operational modes described.

In the operation of the hybrid power system illustrated in FIGS. 1-3 of the drawings, and assuming all components to be at rest, the mode control unit 24 will be in a "neutral" condition and the clutch 14 will be engaged by the compression springs 69. The engine 10 is started in conventional fashion by manipulation of the main switch 46, closure of the ignition switch 42, and energization of an electric starter motor (not shown) drivingly coupled with the flywheel 16. Rotation of the flywheel will crank the engine 10 to initiate operation thereof in conventional fashion. It will be noted that at this stage of operation, the flywheel 16 functions in the same manner as a conventional crank shaft flywheel. Acceleration of the vehicle or other load to be driven by the system is brought about by depressing the accelerator pedal 50 which, through the control of the computer 44, will adjust the mode control unit to engage the clutch C1 and at the same time regulate the speed of the engine by control of the throttle 38 and adjust the speed ratio of the I.V. transmission unit 20 to accelerate the propelling shaft 26 and drive wheels 28. In this respect, it will be noted that while the I.V. transmission may be adjusted in the same manner as a conventional automotive transmission to relate speed and torque components of the power required for a given rate of acceleration, it will do so more efficiently as a result of the continuously or infinitely variable ratio available in the transmission unit 20. Accordingly, the fuel supply to the engine 10 and the transmission unit 20 may be adjusted to optimize fuel consuming operation of the engine. Propelling of the vehicle at constant low or moderate speeds which require power developing operation of the engine 10 will likewise be carried out in this manner. It is to be noted, however, that at all times during power generating operation of the engine 10, the clutch 14 will be in a fully engaged condition to couple the flywheel 16 and the crank shaft 34 of the engine 10.

Deceleration of the vehicle or load may occur either with or without regenerative braking or storage of kinetic energy in the flywheel 16 and components of the I.V. transmission 20 rotatable therewith. If it is assumed that the flywheel 16 is rotating at less than its maximum permitted speed and that it is desired to decelerate the vehicle at a higher rate of deceleration than would occur by coasting, the brake pedal 52 would be depressed, causing the clutch 14 to be either partially or completely disengaged and the I.V. transmission unit 20 to be downshifted. Under this condition, the energy of vehicular momentum would be absorbed or stored by increasing the speed of the flywheel 16. Power generating operation of the engine will be terminated during such deceleration by opening the ignition switch 42 and closing the valve 40 for so long as the speed of the flywheel 16 remains above that speed representing an amount of stored kinetic energy needed to restart the engine by re-engaging the clutch 14 and reversing the condition of the ignition switch 42 and the fuel supply valve 40.

Energy stored in the flywheel may augment the power developed by the engine depending on the amount of accelerating power to be applied to the load as directed by adjustment of the accelerator pedal 50 and the percentage of that accelerating power available as kinetic energy in the flywheel 16. For example, if the flywheel is rotating at speeds above the speed of the engine and load accelerating power is called for, the accelerating power will be supplied by the flywheel 16 through the I.V. transmission unit 20 until the flywheel slows to a rotational speed approximating that engine speed at which the engine 10 will develop power called for by the particular adjustment of the accelerating pedal 52. When the energy available in the flywheel represents a large percentage of the accelerating power called for, engine speed required to develop that accelerating power may be at or only slightly above idling speed. In this case, engine operation with fuel supply would merely be reinitiated when the speed of the flywheel dropped to the idling speed of the engine. If, on the other hand, maximum accelerating power is called for at a time when the flywheel is rotating at its maximum permissible speed and also when the engine is off, system operation would involve opening the fuel supply valve 40 to reinitiate fueled operation of the engine 10. In this condition, power transmitted to the load would be supplied both from the flywheel 16 and the engine 10. In particular, the clutch 14 will be adjusted toward a condition of full engagement during the period of such maximum acceleration. At the same time, the I.V. transmission 20 will be adjusted toward a higher output/input speed ratio. The kinetic energy stored in the flywheel may be dissipated as power either to the load through the I.V. transmission 20, to the engine 10 through the clutch 14 and thus reduce the time required for the engine to attain full power generating speeds, or the flywheel power may be transmitted to both the load and the engine. The precise distribution of flywheel power at any instant of maximum acceleration may be optimized by controlled adjustment of the clutch 14 and the I.V. transmission unit 20. In any event, flywheel speed will decrease whereas engine speed will increase to a point where engine and flywheel speeds are equal. Thereafter, continued application of maximum accelerating power would be developed exclusively by the engine 10. Thus, it will be seen that power for acceleration of a vehicle, or of an intertial load in general, may be a combination of energy stored in the flywheel 16 and power developed by the engine 10.

When it is desired to use the engine 10 to decelerate the inertial load represented by an automotive vehicle, the fuel supply valve 40 may be again turned off and the clutch 14 fully engaged to couple the engine and wheels 28. Also, the engine throttle 38 may be closed to maximize the pumping torque of the engine and the I.V. transmission may be downshifted or otherwise regulated to achieve the degree of engine braking desired.

Under operating conditions where the vehicle or load is to be driven at relatively constant speeds requiring continuous development of power by the prime mover or engine 10, such as under highway driving conditions in the case of an automotive vehicle, the mode control unit is shifted to the "direct drive" mode by engaging the clutch C3 and disengaging the clutches C1 and C2. In this condition of operation, the engine drive shaft 12 will be coupled directly with the load propelling shaft 26 with the result that the I.V. transmission unit 20 will merely idle with no torque transfer between the traction drive components thereof. While the surfaces of the cone members 100 and 102 may be in contact with the traction surfaces on the rings 106 and 108, the absence of a torque load will preclude any normal force loading of these components. Also, it is contemplated that these surfaces may be retracted out of engagement with each other under a no-load condition.

In the "direct drive" mode, therefore, the system operates as a conventional automotive drive train with the flywheel 16 and components rotatable therewith functioning solely in the manner of a conventional crank shaft flywheel. The facility for shifting to a direct drive is made available by the mode control unit 24 and provides the potential for overall system efficiencies higher than a system using an appropriately designed I.V. transmission unit alone. It is known, for example, that the fuel consuming efficiency of a conventional automotive drive train in a "direct drive" mode at continuous moderate to high speeds is quite good. In the "direct drive" mode of the present invention, such existing conditions are retained with no loss of efficiency in the system due to efficiency losses in the transmission unit 20. Also it will be appreciated that where the unit 20 is designed for a ratio range extending to 1:1, alternate coupling of the load propelling shaft 26 with the variable speed output shaft 22 and the direct drive shaft 30 may be synchronous with no energy loss upon engagement of the clutch C3. The characteristics of the I.V. transmission unit 20, however, are such that its operating efficiency increases to maximum at the high end of its output/input speed ratio range. The mode control unit, therefore, and in particular the clutch C3 enables an I.V. transmission unit design with an output/input speed ratio range extending from zero to less than 1:1 thereby to provide increased I.V. unit efficiencies when the unit 20 is needed for intermittent or city driving conditions under which the energy storing capacity of the flywheel is important to reduced fuel consumption. It is contemplated, therefore, that shifting the coupling of the load propelling shaft 26 between the variable speed output shaft 22 and the direct drive shaft 30 may be nonsynchronous; that is, with the slipping of the clutch C3 and a corresponding loss of energy less than that gained by increased efficiency in the operation of the I.V. unit 20. It will be appreciated, therefore, that the mode control unit 24 adds materially to design flexibility in the overall system.

Figure 4:
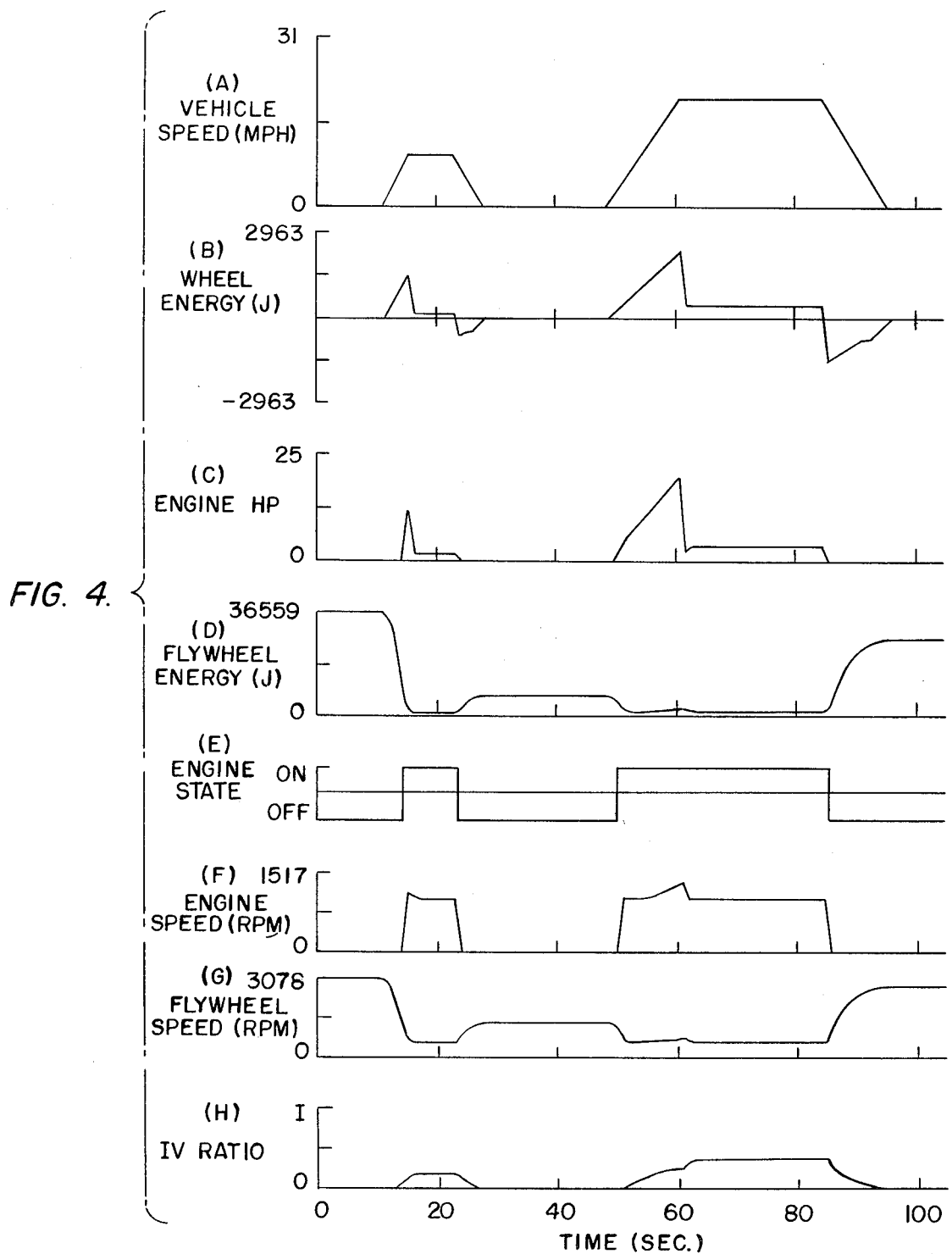
FIG. 4 is a set of graphs in which quantitative values of various parameters are plotted on ordinates against a common abscissa.

To provide a more complete understanding of the hybrid system shown in FIGS. 1–3 under intermitent or city driving conditions, reference is made to FIG. 4 of the drawings in which curves are plotted in which calculated quantitative values of eight parameters are plotted against time in seconds. The curves shown in FIG. 4 were calculated using a computer simulated automotive passenger vehicle equipped with the hybrid power system shown in FIGS. 1–3 and having the following specifications:

| | |
|---|---|
| Vehicle Weight | 2890 lbs (curb) |
| | 3190 lbs (loaded) |
| Engine | 2.1 liter with fuel injection |
| | 4 cylinders in-line |
| | 100 HP at 5250 rpm |
| | Compression ratio 8.5:1 |
| Axle Ratio | 3.73:1 |
| Max. I.V. Unit Efficiency | 91% |
| Combined inertia of flywheel and connected rotary parts | 0.704 Kg-m$^2$ |
| Exhaust System | Closed loop Lambda-Sond converter with 3-way catalyst |

With reference to curves A–H of FIG. 4, curve A is a graphic representation of part of a standard city driving cycle. Curve B is the result of plotting as ordinate values, energy in Joules needed at the drive wheels to accelerate the mass of the vehicle against its aerodynamic and rolling resistance to the speed on curve A corresponding to the same point in time. Negative values on curve B represent energy recoverable during deceleration.

Curve C is the portion of wheel energy in horse power to be supplied by the engine. Curve D is the energy in Joules available from the flywheel and parts rotatable directly therewith. As above-mentioned, in reaccelerating the vehicle from a stop, energy is first drawn from this source with the difference needed to make up the required wheel energy to be supplied by the engine.

Curves E and F illustrate, respectively, whether the engine is off or on and when on, the speed of the engine. Flywheel speed is represented by curve G and I.V. ratio expressed as output/input is represented by curve H.

The curves illustrated in FIG. 4 were developed by a computer simulation of the vehicle above-mentioned. Although not shown in FIG. 4, the same computer simulation results in a fuel economy gain of from 19 mpg to 32 mpg and with low emission levels, specifically $NO_x$—0.06, CO—0.33 and HC—0.09. Although it is recognized that results in actual practice will be somewhat less than these theoretical results due to transients and other factors that cannot be taken into consideration by a computer simulation, the potential theoretical gains are so substantial that actual results which fall considerably short of the theoretical results would represent a substantial improvement in fuel economy.

The significance of the clutch 14 in terms of its physical position and function in the system of the present invention will now be appreciated. It will be noted first that at all times when the engine 10 is used for its primary purpose of developing load driving power (or under certain circumstances as described for absorbing load momentum), the clutch 14 is fully engaged to provide a direct coupling of the engine crank shaft 34 with the flywheel 16 and the input shaft 18 of the I.V. transmission unit 20. When such a coupling exists, the flywheel 16 rotates at the same speed of the engine crank shaft 34 and acts in all respects as a conventional crank shaft flywheel.

Secondly, adjustment of the clutch 14 to a condition of partial engagement in which it will transmit only a limited amount of torque enables the engine or prime mover 10 to be cranked with the fuel supply 36 cut off or reduced and at speeds which are substantially below flywheel speeds but adequate to maintain continuity of lubrication, continuity of accessory drives and the like. As will be appreciated by those skilled in the art, the idling speed for an engine or prime mover may vary widely. The term "idling speed" has meaning in the art, however, and is intended herein and in the appended claims to mean that minimum speed at which the engine or prime mover 10 will sustain operation with fuel alone at no load. "Cranking speed," where used herein and in the appended claims, is intended to mean that speed at which engine pumping and friction losses are minimal and at which engine driven accessories, such as coolant and lubricant circulating pumps, electric storage battery charging systems as well as power driven accessories like power steering, power brakes and air conditioning are maintained. Torque losses in cranking the engine 10, namely pumping losses and friction losses, approach a minimum near idling speed but decrease further at a lower cranking speed. Since the cranking speed is a function of torque transmitted through the clutch 14, the precise speed at which the engine will be cranked may be regulated by adjusting the pressure under which the friction pads 68 are urged against the disc 64. The losses of so cranking the engine 10 may be further reduced by opening the throttle 38 during the period that the clutch is adjusted to crank a conventional automotive internal combustion engine and even further by closing the valves (not shown) of the engine in accordance with the disclosure of an article entitled "Valve Selector Hardware" SEA Technical Paper 78 0146, dated Mar. 3, 1978.

When the engine is cranked using kinetic energy stored in the flywheel as above described, the fuel supply valve 40 may be completely closed or it may be adjusted to a partially closed condition in which the fuel supply to the engine is reduced to a level below that necessary to maintain engine operation by fuel supply alone. While maximum conservation of potential energy or fuel will often result with the valve 40 or its equivalent completely closed, overall system operation at minimal fuel consumption may be improved by fuel supply at levels reduced below that necessary to maintain engine idle speeds but adequate to maintain engine temperature.

Finally, the clutch 14 may be adjusted to a completely disengaged condition and the engine 10 completely shut off so long as adequate kinetic energy is stored in the flywheel for engine restarting purposes. Where this mode of operation is contemplated, the system may be provided with a separate accessory drive (not shown) extending from the flywheel 16 to the various accessories to be driven by the flywheel during periods of time the engine 10 is inoperative.

Figure 5:
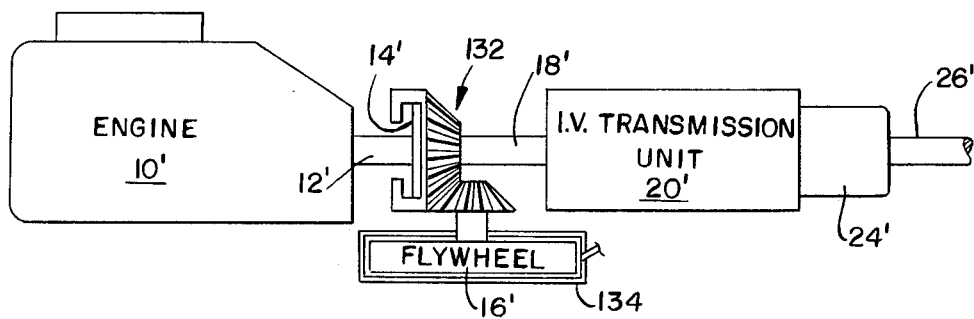
FIG. 5 is a schematic illustration of components in a modified embodiment of the invention.

In FIG. 5 of the drawings, a modified embodiment is schematically illustrated to include the same power train components shown in FIG. 1 except that the flywheel 16' is linked or drivingly connected for rotation with the shaft 18' at a fixed ratio by bevel gearing 132 and is of a design capable of storing larger amounts of kinetic energy than the flywheel 16 of FIG. 1. The gear ratio of the gearing 132 is selected so that the flywheel rotates at a higher speed than the shaft 18'. To represent the relative class of the flywheel 16', an evacuated housing 134 is illustrated schematically in FIG. 5 as representative of means to cut windage losses in a flywheel of this type. Although the engine 10' or prime mover of the system illustrated in FIG. 5 is like the engine 10 in FIG. 1 in all respects, it is intended in this case to be a prime mover which operates at a governed or constant operating speed with variation in power and torque being the result of variation in the amount of fuel injected into the engine 10'. The mode control unit 24' may be modified from the unit 24 of FIG. 1 only in terms of reduction ratio. The system of FIG. 5 is, therefore, representative of a power system for use in larger vehicles such as buses or trucks where the power to weight ratio is low relative to automotive vehicles, for example, where high rates of load acceleration are called for.

The principal difference in the operation of the system disclosed in FIG. 5 to practice a variation in the method of the present invention resides in operation so that the speed of the flywheel is maintained at all times above the governed operating speed of the engine 10'. The clutch 14' is retained in the system of FIG. 5 and as before, is operable to transmit full engine power in the direction of the load. On startup, therefore, the engine 10' will be operated to supply kinetic energy to the flywheel until such time as the rotational speed of the flywheel 16' is the same as the governed operating speed of the engine power shaft 12. Load acceleration is initiated after adjustment of the unit 24' and by adjustment of the I.V. transmission 20'.

On load deceleration, the kinetic energy of load momentum is fed back as before to the flywheel 16' but to drive the flywheel at speeds substantially in excess of engine operating speeds. This is accomplished by downshifting the I.V. transmission 20'. During subsequent acceleration of the load, assuming the flywheel 16' to be rotating at near maximum speeds of, for example, two to three times the operating speed of the engine drive shaft 12', the kinetic energy stored in the flywheel may be directed to the load, to the engine or both in a manner comparable to that described above with respect to FIG. 1. Because of the relative engine and flywheel speeds, however, prime mover developed power will never be directed to or absorbed by the flywheel 16'. Prime mover developed power will, of course, maintain minimal flywheel speeds by supplying a sufficient amount of energy to overcome friction and other losses tending to reduce the speed of flywheel rotation. In all other respects, the operation of the embodiment of FIG. 5 is the same as that described above with respect to FIG. 1.

Figure 6:
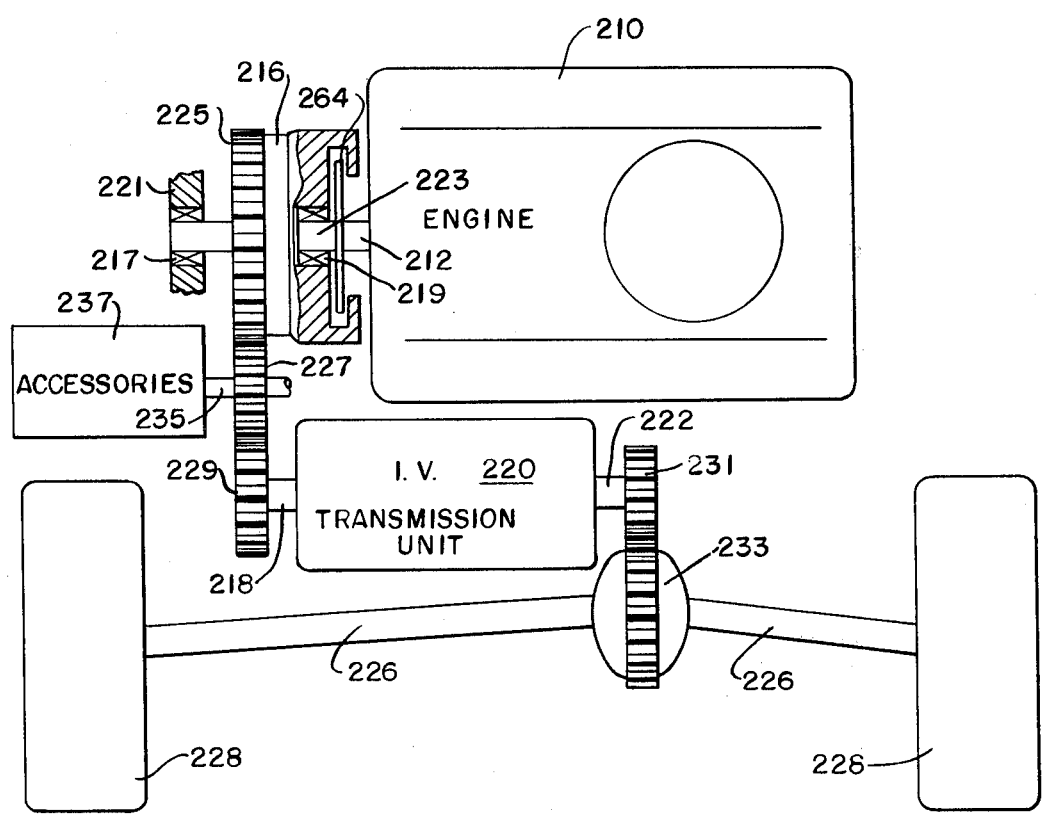
FIG. 6 is a similar schematic illustration of another modified embodiment of the invention.

In FIG. 6, the hybrid system of the invention is embodied in a power train of the type in which the engine or prime mover axis is generally parallel to the load propelling shaft or shafts. Such power trains are particularly suited to automotive front wheel drives, for example. Thus in FIG. 6, the engine 210 includes a power shaft 212 which, like the previously described embodiments, is a direct extension of the engine crank shaft without the conventional crank shaft flywheel. As in FIGS. 1 and 2, the power shaft 212 carries a lightweight clutch disc 264 for releasable coupling engagement by clutch components carried directly by a flywheel 216. In this embodiment, the flywheel 216 is journalled by bearings 217 and 219 in a frame component 221 and on an extension 223 of the power shaft 212, respectively. The flywheel 216 is again linked for rotation at all times with the input shaft 218 of the I.V. transmission unit 220. In this instance, however, the linking is through a gear train including a drive gear 225 carried by the flywheel, an idler gear 227 and a driven gear 229 keyed to the I.V. input shaft 218. The variable speed output shaft 222 of the unit 220 is coupled by a gear 231 directly with a differential unit 233 from which a pair of propelling shafts 226 extend to drive wheels 228.

The idler gear 227 is coupled directly by a shaft 235 with such accessories as the generator, fuel pump, oil pump, air conditioning, power steering unit and power brake unit, all of which are powered normally by the engine 210. Though not detailed in FIG. 6, these accessories are represented by the box 237 and labeled "accessories". An important feature of the power train shown in FIG. 6 is that the inclusion of the accessory drive in the gear train between the flywheel 216 and the I.V. input shaft 218 enables the accessories to be powered by the flywheel 216 with the flywheel completely disengaged from the clutch disc 264 and the engine 210 completely shut off. The operational characteristics of the embodiment shown in FIG. 6 are otherwise the same as the previously described embodiments.

Thus it will be appreciated that as a result of the present invention, a highly effective hybrid power system and method is provided by which the aforementioned objectives are completely fulfilled. It is contemplated that various components of the system may be modified and further that such modifications will be apparent to those skilled in the art from the preceding description. Accordingly, it is expressly intended that the foregoing description is illustrative of a preferred embodiment only, not limiting, and that the true spirit and scope of the present invention be determined by reference to the appended claims.

What is claimed is:

1. A hybrid power system for driving an inertial load, said system comprising:
a prime mover having a power shaft and means for converting a succession of power impulses to rotary motion in said power shaft, said means requiring an auxiliary supply of kinetic energy to maintain continuity and smoothness of power shaft rotation during power generating operation of said prime mover;
a flywheel having a kinetic energy storage capacity sufficient to provide said auxiliary supply of kinetic energy;
variable speed transmission for transmitting torque between said flywheel and the inertial load;
adjustable coupling means between said prime mover power shaft and said flywheel, said coupling means being adjustable between a condition of full engagement for driving connection of said power shaft, said flywheel and said transmission means, through an intermediate condition of partial engagement in which said flywheel and said power shaft are yieldably connected for transmission of limited torque, and a condition of complete disengagement to disconnect said flywheel and said power shaft, thereby to provide a range of engagement varying from maximum at said condition of full engagement to minimum at said condition of complete disengagement; and
means for adjusting said coupling means throughout said range of engagement.

2. The system recited in claim 1, wherein said means for converting power impulses to rotary motion comprises a crank shaft, said power shaft being a direct extension of said crank shaft.

3. The system recited in either of claims 1 or 2, wherein said variable speed transmission comprises an input shaft, an output shaft and means for the transmission of power between said input and output shafts at infinitely variable speed ratios in a range of speed ratios.

4. The system recited in claim 3, wherein said adjustable coupling means includes one end directly connected for rotation with said power shaft and another end connected for rotation in a fixed speed ratio with said input shaft and said flywheel, respectively.

5. The system recited in claim 4, wherein said flywheel is keyed to said input shaft.

6. The system recited in claim 4, including gear means to connect said flywheel and said input shaft.

7. The system recited in claim 6, wherein said gear means has a gear ratio by which the speed of the flywheel is greater than the speed of said input shaft.

8. The system recited in claim 1, wherein said adjustable coupling means in said condition of partial engagement defines means for transmitting torque from said flywheel to said power shaft in amounts limited to the torque needed to crank the power shaft and the prime mover at cranking speeds lower than the idling speed of the prime mover.

9. The apparatus recited in claim 1, wherein said variable speed transmission comprises:
means defining a frame, a cranking body journalled for rotation in said frame on a first axis, a rotatable input shaft coupled to said cranking body, a nutating body journalled for rotation in said cranking body on a second axis inclined with respect to and intersecting said first axis, a variable speed output shaft, and means for converting movement of said input shaft, said cranking body and said nutating body to rotation of said variable speed output shaft at infinitely variable ratios of the speed of said input shaft rotation.

10. The apparatus recited in claim 9, wherein said cranking body is of a length approximating the length of the transmission along said first axis and is journalled for rotation in said frame by bearings at opposite ends of said cranking body and concentric with said first axis, said flywheel and said input shaft being supported directly by said cranking body.

11. The apparatus recited in either of claims 9 or 10, including a direct drive shaft concentric with said variable speed output shaft and keyed to said cranking body thereby to rotate directly with said input shaft, said flywheel and said cranking body.

12. The apparatus recited in claim 11, comprising a load propelling shaft and means for alternately coupling said direct drive shaft and said variable speed output shaft to said load propelling shaft.

13. The apparatus recited in claim 12, wherein said direct drive shaft and said variable speed output shaft are rotatable in opposite directions for a given direction of input shaft rotation and wherein said means for alternately coupling said direct drive shaft and said variable speed output shaft to said load propelling shaft includes reversing gear means for coupling said variable speed output shaft and said load propelling shaft.

14. The apparatus recited in claim 12 wherein said means for alternately coupling said direct drive shaft and said variable speed output shaft to said load propelling shaft includes a friction clutch for releasably coupling said direct drive shaft and said load propelling shaft.

15. The apparatus recited in either of claims 9 or 10, wherein said flywheel, said input shaft, said cranking body and said variable speed output shaft are concentric with said first axis.

16. A power train assembly for releasably connecting the crank shaft of a piston engine and an inertial load propelling shaft, said assembly comprising:
a casing;
an infinitely variable transmission unit enclosed by said casing and including a cranking body journalled for rotation in said casing on a first axis, a nutating body journalled for rotation in said cranking body on a second axis inclined with respect to and intersecting said first axis, a variable speed output shaft, and means for converting movement of said cranking body and said nutating body to rotation of said variable speed output shaft at infinitely variable ratios of the rotational speed of said cranking body;
means for connecting said variable speed output shaft and the load propelling shaft at one end of said casing;
a flywheel supported by and rotatable directly with said cranking body;
friction clutch means at the opposite end of said casing for releasably coupling the engine crank shaft to said flywheel and said cranking body; and
means for controlling said clutch to engage the crank shaft and said flywheel at all times during power generating operation of the engine and to at least partially disengage said clutch to enable energy storing rotation of said flywheel independent of crank shaft rotation.

17. The apparatus recited in claim 16, including a direct drive shaft concentric with said variable speed output shaft and connected for direct rotation with said cranking body.

18. The apparatus recited in claim 17, comprising means for alternately coupling said direct drive shaft and said variable speed output shaft to the load propelling shaft.

19. The apparatus recited in claim 17, wherein said direct drive shaft and said variable speed output shaft are rotatable in opposite directions for a given direction of input shaft rotation and wherein said means for alternately coupling said direct drive shaft and said variable speed output shaft to said load propelling shaft includes reversing gear means for coupling said variable speed output shaft and said load propelling shaft.

20. The apparatus recited in either of claims 18 or 19, wherein said means for alternately coupling said direct drive shaft and said variable speed output shaft to said load propelling shaft includes a friction clutch for releasably coupling said direct drive shaft and said load propelling shaft.

21. The method of operating a hybrid power system to drive an inertial load, the system including a prime mover with a regulated fuel supply for operation at idling speeds to drive power accessories and at higher speeds to drive the accessories and to propel the inertial load, and a kinetic energy storage device, said method comprising the steps of:
storing the kinetic energy of load momentum during deceleration of the load;
terminating fueled operation of the engine during periods of load deceleration and rest;
transmitting said stored kinetic energy as power for continued driving of the accessories when fueled operation of the prime mover is terminated; and
restarting fueled operation of the prime mover when said stored kinetic energy is dissipated to a level required for initiating fueled operation of the prime mover.

22. The method recited in claim 21, wherein said stored kinetic energy is transmitted as power to crank the prime mover for continued driving of the accessories and including the step of reducing the fuel supply to less than that required for prime mover operation using fuel alone.

23. the method recited in claim 22, comprising the step of shutting off completely the fuel supply to the prime mover during cranking thereof by transmission of said stored kinetic energy.

24. The method recited in claim 21, including the step of combining said stored kinetic energy with power developed by the prime mover to accelerate the load.

25. The method recited in claim 24, wherein the energy storage device is a flywheel, wherein the prime mover includes a rotatable output shaft and wherein said combining of stored kinetic energy and prime mover developed power comprises discharging kinetic energy stored in the flywheel while increasing the speed of the power shaft until the respective speeds of the power shaft and flywheel are equal.

26. The method recited in claim 25, comprising the step of further increasing at equal rates of increase, the speeds of the power shaft and the flywheel.

27. The method recited in either of claims 21, 22 or 24, wherein the prime mover develops variable power at constant speed, wherein the energy storage device is a flywheel and including the step of maintaining the speed of said flywheel above the speed of the prime mover.

28. The apparatus recited in claim 13, wherein said means for alternately coupling said direct drive shaft and said variable speed output shaft to said load propelling shaft includes a friction clutch for releasably coupling said direct drive shaft and said load propelling shaft.

29. A hybrid power system for driving an inertial load and for storing the kinetic energy of load deceleration, said system comprising:
a fuel consuming prime mover having an output power shaft and which requires an inertial mass, such as a crank shaft flywheel, for power generating operation;
a flywheel providing at least the inertial mass required for power generating operation of said prime mover;
a variable speed ratio transmission for transmitting power from said flywheel to the inertial load and for transmitting the kinetic energy of load momentum from said load to said flywheel;
releasable coupling means to connect said prime mover power shaft and said flywheel when said coupling means is fully engaged and to provide for rotation of said flywheel independently of said power shaft when not fully engaged; and
control means to engage said coupling means at all times during fuel consuming operation of said prime mover, to at least partially disengage said coupling means and to terminate fuel consuming operation of said prime mover during load deceleration and when the kinetic energy stored in said flywheel is more than that required to restart power generating operation of said prime mover.

30. A hybrid power system as defined by claim 29, wherein said transmission includes means to provide a range of continuously variable speed ratios.

31. The system recited in claim 30, wherein said transmission comprises a cranking body adapted for rotation with said power shaft on a first axis, a nutatable body rotatable in said cranking body on a second axis inclined with respect to and intersecting said first axis, and traction means for converting movement of said nutatable body to a rotatable drive connection with the load.

32. The system recited in claim 31, wherein the rotational axes of said flywheel, said cranking body and said power shaft are aligned to be coaxial with said first axis.

33. The method of operating a hybrid power system to drive an inertial load, the system including a prime mover with a regulated fuel supply for power generating operation and a kinetic energy storage device, said method comprising the steps of:
storing the kinetic energy of load momentum during deceleration of the load;
terminating fueled operation of the engine during periods of load deceleration and rest;
transmitting said stored kinetic energy as load driving power when fueled operation of the prime mover is terminated; and
restarting fueled operation of the prime mover when said stored kinetic energy is dissipated to a level required for initiating fueled operation of the prime mover.

34. The method of operating a hybrid power system to drive an inertial load, the system including an energy consuming prime mover which requires energy to initiate power generating operation, and an energy storing flywheel, said method comprising the steps of:

connecting said prime mover and said flywheel with the load at all times during power generating operation of said prime mover to drive the load;

terminating energy consuming operation of said prime mover during load deceleration and rest;

disconnecting said prime mover and said flywheel during load deceleration;

storing the kinetic energy of load momentum by accelerating the flywheel during load deceleration;

transmitting kinetic energy from said flywheel as load driving power when energy consuming operation of said prime mover is terminated; and reconnecting said prime mover and said flywheel to restart energy consuming operation of said prime mover when the kinetic energy stored in said flywheel is dissipated to a level required for initiating such operation of the prime mover.

* * * * *